E. WHEELER.
Car Seat and Couch.
No. 21,099. Patented Aug. 3, 1858.
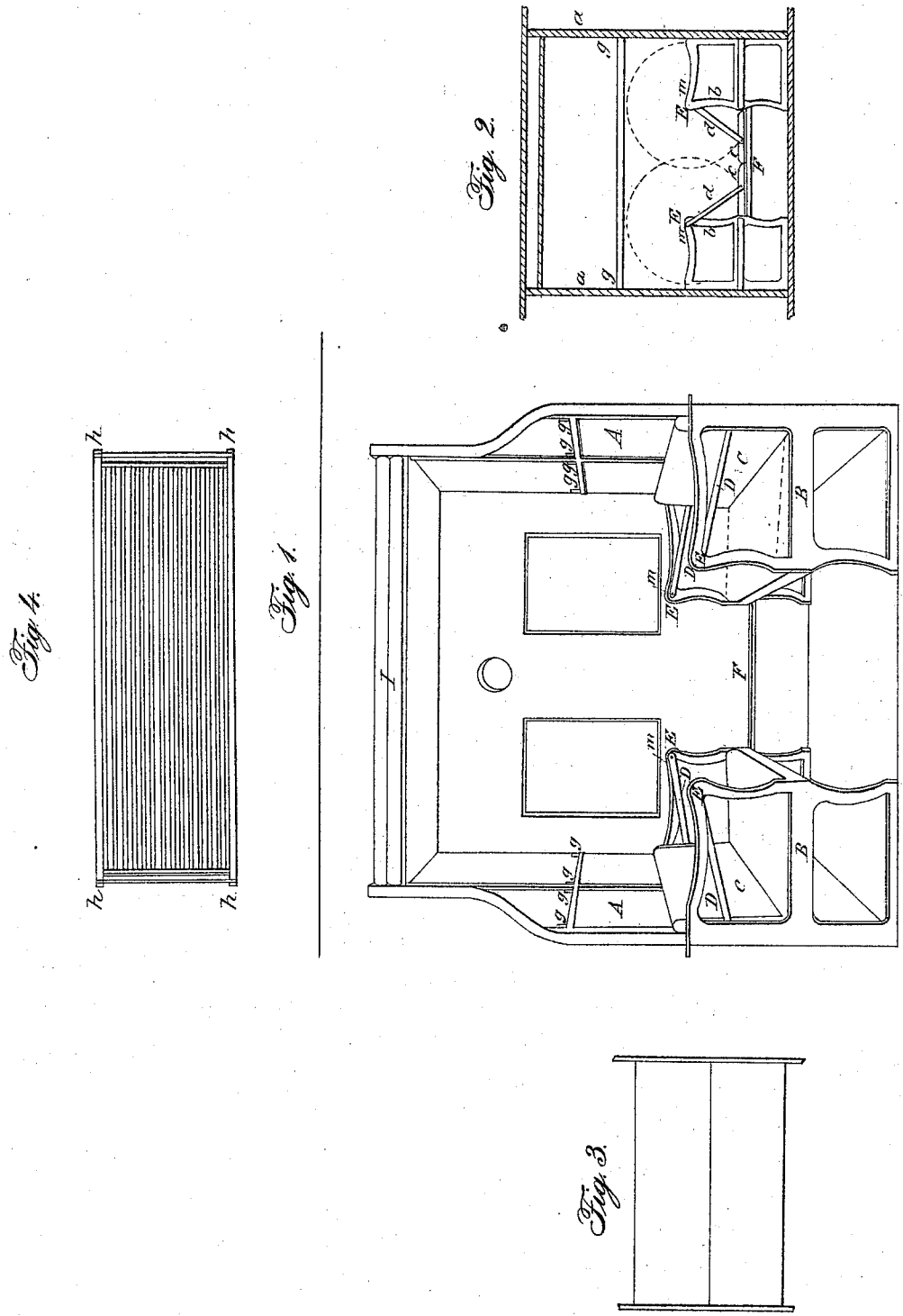

UNITED STATES PATENT OFFICE.

E. WHEELER, OF ELMIRA, NEW YORK.

SLEEPING-CAR FOR RAILROADS.

Specification of Letters Patent No. 21,099, dated August 3, 1858.

*To all whom it may concern:*

Be it known that I, ELI WHEELER, of Elmira, in the county of Chemung and State of New York, have invented a new and useful Improvement in Convertible Seats for Sleeping-Cars; and I do hereby declare that the following is a full, clear, and exact description of the same, reference being had to the accompanying drawings, forming a part of this specification, in which—

Figure 1, is a perspective view of a compartment of a railroad car, furnished with two of my improved convertible seats which will comfortably accommodate four persons. Fig. 2, is a side view of the same compartment, so fitted up and its seats so adjusted as to comfortably accommodate four persons with couches to sleep upon. Fig. 3, shows the backs of the seats, brought together so as to convert the seats into a sleeping couch as in Fig. 2. Fig. 4, shows the underside of half of the upper couch.

Similar letters of reference, in each of the several figures indicate corresponding parts.

The object of my improvement is to so simplify the mode of arranging and adjusting convertible car seats that the most unskilful passenger may be able to convert his seat into a sleeping couch with the greatest convenience and in a moment's time, and again with equal facility readjust it so as to have it answer as a chair, my improvement avoiding the necessity of decreasing the width existing between each pair of seats and also bringing the couch when formed entirely within the compartment or berth instead of having one portion extend a considerable distance beyond the back edge of one of the seats in a manner to render impracticable the construction of the car compartments separate.

*Nature.*—In connection with a pair of car seats which are inclosed within a compartment and placed at the proper distance apart, and facing each other.

My invention consists in pivoting by fixed pivots, the backs of said pair of seats at such points on the arms of the seat frame, and in such relation to each other, that by turning the backs over in opposite directions, in the path of a vertical circle, they will both be brought and made to lie horizontally or on a level with the cushions of the seats, within the space existing between the two seats and upon a supporting cleat and thus form a comfortable sleeping couch entirely inclosed within the compartment. This arrangement dispenses with sliding pivots, slotted brackets or supports and other devices which complicate and render useless and impracticable for the purposes intended convertible sleeping seats in railroad cars, on account of the skill and ingenuity necessary on the part of passengers to understand and manage the same.

To enable others, skilled in the art, to make and use my invention, I will proceed to describe its construction and operation.

*Construction.*—Divide an ordinary passenger car into compartments as shown in Figs. 1, and 2 by partitions, six feet, more or less, apart. A, A, $a$, $a$. These compartments are left open fronting the passageway through the length of the car.

B, B, $b$, $b$, show the frame of a common car seat. C, C, $c$, $c$, the backs of the seats upholstered on the inside. D, D, $d$, $d$, the levers by which the backs of the seats are moved and sustained. The fulcrum $m$, of each lever is at the front end of the arm of the seat E, by which adjustment of it, the backs in turning over as shown by the dotted arc of a circle in Fig. 2, come together as seen in Fig. 3 and exactly fill the space between the seats, thus forming a couch. The outside ends of the back rest upon a cleat F, Fig. 1. The movable cushions make the pillows.

The upper couch is constructed in two parts, the underside of one of which is shown in Fig. 4.

The sides and ends of the parts are made of wood, but slightly elastic, the center slats thinner and more elastic fastened at the ends by transverse pieces of wood or metal and the whole upholstered on the upper side. At a distance of three feet, more or less, above the lower couch, are made fast to the partition angle plates of metal denoted by the letter $g$, on Figs. 1, and 2, as resting places and supports for the corners of the couch $h$, when used. When the upper couch is not in actual use, the pieces composing it may be laid away upon the shelf.

What I claim as my invention and desire to secure by Letters Patent, is—

In connection with a pair of car seats B, B, $b$, $b$, which are inclosed within a compartment A, $a$, and placed at the proper distance apart, pivoting by fixed pivots $m$, $m$, the backs $c$, $c$, of said pair of seats at such points on the arms of the seat frame B, B, b, b, and in such relation to each other that by turning the backs over in opposite directions, in the path of a vertical circle, they will both be brought and made to lie horizontally or on a level with the cushions of the seats, within the space existing between the two seats and upon a supporting cleat E and thus form a comfortable sleeping couch entirely inclosed within the compartment, substantially as and for the purposes set forth.

ELI WHEELER.

Witnesses:
 JAY HYATT,
 FREDERICK PURRITT.